United States Patent [19]

Slater

[11] Patent Number: 5,038,667

[45] Date of Patent: Aug. 13, 1991

[54] AUTOMOBILE ANTI-THEFT DEVICE FOR CONTROL LEVERS

[75] Inventor: Jack Slater, Etobicoke, Canada

[73] Assignee: M.D. Motolok Developments B.V., Guernsey, Channel Islands

[21] Appl. No.: 542,597

[22] Filed: Jun. 22, 1990

[30] Foreign Application Priority Data

Apr. 10, 1990 [CA] Canada .................................. 2014324

[51] Int. Cl.⁵ .............................................. B60R 25/06
[52] U.S. Cl. ...................................... 70/199; 70/238; 70/247; 403/58
[58] Field of Search ............... 70/238, 237, 198–203, 70/247, 254, 211, 239; 403/58

[56] References Cited

U.S. PATENT DOCUMENTS

| | | | |
|---|---|---|---|
| 1,140,383 | 5/1915 | Leeker | 70/203 |
| 1,179,275 | 4/1916 | Bruehne | 70/199 |
| 1,232,746 | 7/1917 | Yelton et al. | 70/237 |
| 1,329,644 | 2/1920 | Van Deventer et al. | 70/200 |
| 1,480,149 | 1/1924 | Carpenter | 70/203 |
| 1,569,721 | 1/1926 | Dalferes | 70/202 |
| 4,561,797 | 12/1985 | Aldridge | 403/58 |
| 4,825,671 | 5/1989 | Wu | 70/238 |
| 4,835,999 | 6/1989 | Chant | 70/238 |
| 4,936,120 | 6/1990 | Fiks | 70/238 X |

FOREIGN PATENT DOCUMENTS

| | | | |
|---|---|---|---|
| 1053903 | 10/1953 | France | 70/198 |
| 461077 | 1/1951 | Italy | 70/203 |
| 600913 | 12/1959 | Italy | 70/202 |
| 297498 | 9/1928 | United Kingdom . | |
| 1131583 | 10/1968 | United Kingdom . | |
| 1186583 | 4/1970 | United Kingdom . | |
| 1269513 | 4/1972 | United Kingdom | 70/238 |
| 2021499 | 12/1979 | United Kingdom . | |
| 2122153 | 1/1984 | United Kingdom . | |
| 2142889 | 1/1985 | United Kingdom | 70/198 |

Primary Examiner—Lloyd A. Gall
Attorney, Agent, or Firm—Blake, Cassels & Graydon

[57] ABSTRACT

This invention relates to improvements made to an anti-theft device for conventional motor vehicles and the method by which the device is made, which device secures the hand brake lever to the gear shift lever. A device is already known, which is made up of two limbs which are pivotally connected together. This invention adds an additional improvement which allows for further rotation of the limbs on an additional axis and further adds an expanded bore in the clamping arm which permits the device to fit a wide range of automobiles. As well the device itself and the method by which it is constructed have also been improved to eliminate virtually all welding except in the area of the locking element.

20 Claims, 6 Drawing Sheets

AUTOMOBILE ANTI-THEFT DEVICE FOR CONTROL LEVERS

BACKGROUND OF THE INVENTION

1. Field of the Invention

The invention relates to improvements made to a compact anti-theft device for locking the control levers of motor vehicles.

2. Background of the Invention

Anti-theft devices are constructed for vehicles which contain a hand brake lever and gear shift or automatic gear lever on the floor of a vehicle away from the steering column. Such devices comprise two arms pivotally connected together, the first arm being of hollow form so that the hand brake lever fits therein and the second arm has means for attaching to or securing the gear shift lever. Similar apparatus are disclosed, for example, in U.K. Patent Application 2,142,889 published on Jan. 30, 1985; British Patent Specification 1,131,583 published on Oct. 23, 1968; U.K. Patent Application 2,021,499 published Dec. 5, 1979 and U.K. Patent Application 2,122,153. Other examples of devices used for locking the control levers of automobiles can be found in U.K. Patent Specification 297,498 granted Sept. 24, 1978 and U.K. Patent Specification 1,186,853 published Apr. 8, 1970, however they are only indicative of general prior art.

While these devices suit a variety of different vehicles, and certain of them have features to allow them to extend longitudinally in order that they can span various distances between the brake lever and gear shift lever, they are generally rigid and immobile and therefore will not fit the widest variety of vehicles. For example, if the hand brake is located to the left or right of the gear shift lever these devices are not suitable to accommodate such configurations. As well, certain automobiles made in North America whose control levers are of a larger diameter do not fit through the bore meant to hold the gear shift lever.

The present invention, aims to provide an anti-theft device for locking together two adjacent controls of a vehicle in particular the hand brake lever and the gear lever, which device is capable of fitting a greater number of different makes and models of vehicles. It is believed that the improvement allows this device to fit approximately 33% more vehicles than prior devices of similar type, for example the device described in U.K. Patent Specification No. 2,142,889.

According to the present invention there is provided an anti-theft device for securing two control levers of a vehicle, the device comprised of a first hollow limb having an open end adapted to fit over one control lever and a second limb adapted to releaseably shackle a second control lever.

The first limb is pivotally connected to the second limb, for pivotal movement of the limbs relative to each other in first and second pivot axes, each axis being orthogonal to the longitudinal axis of the first limb. The relative positions of the first and second limbs are adjustable to locate therein and shackle respectively the first and second control levers.

Therefore, if the gear shift lever does not rise completely perpendicular to its base or if it is situated to the right or left of the hand brake, the second limb of the device can swing to either side of said centre line to accommodate the angle, thereby fitting a large variety of options. However, there should be a limit to how far this device can swing to each side so as to make it impossible to put the car into gear.

Preferably, the open bore which fits around the gear shift lever situated between the shackling arm of the device and the second part of the second limb has been made large enough so that it can fit all gear shift levers. However such bore should not be large enough to enable the bore to slip over the gear shift knob. A resiliently deformable insert can be fitted inside the open bore to closely surround and secure the gear shift lever and prevent scratching or bumping.

BRIEF DESCRIPTION OF THE DRAWINGS

Embodiments of the invention will now be described by way of example with reference to the attached drawings in which.

DESCRIPTION OF THE PREFERRED EMBODIMENT

Figure 1:
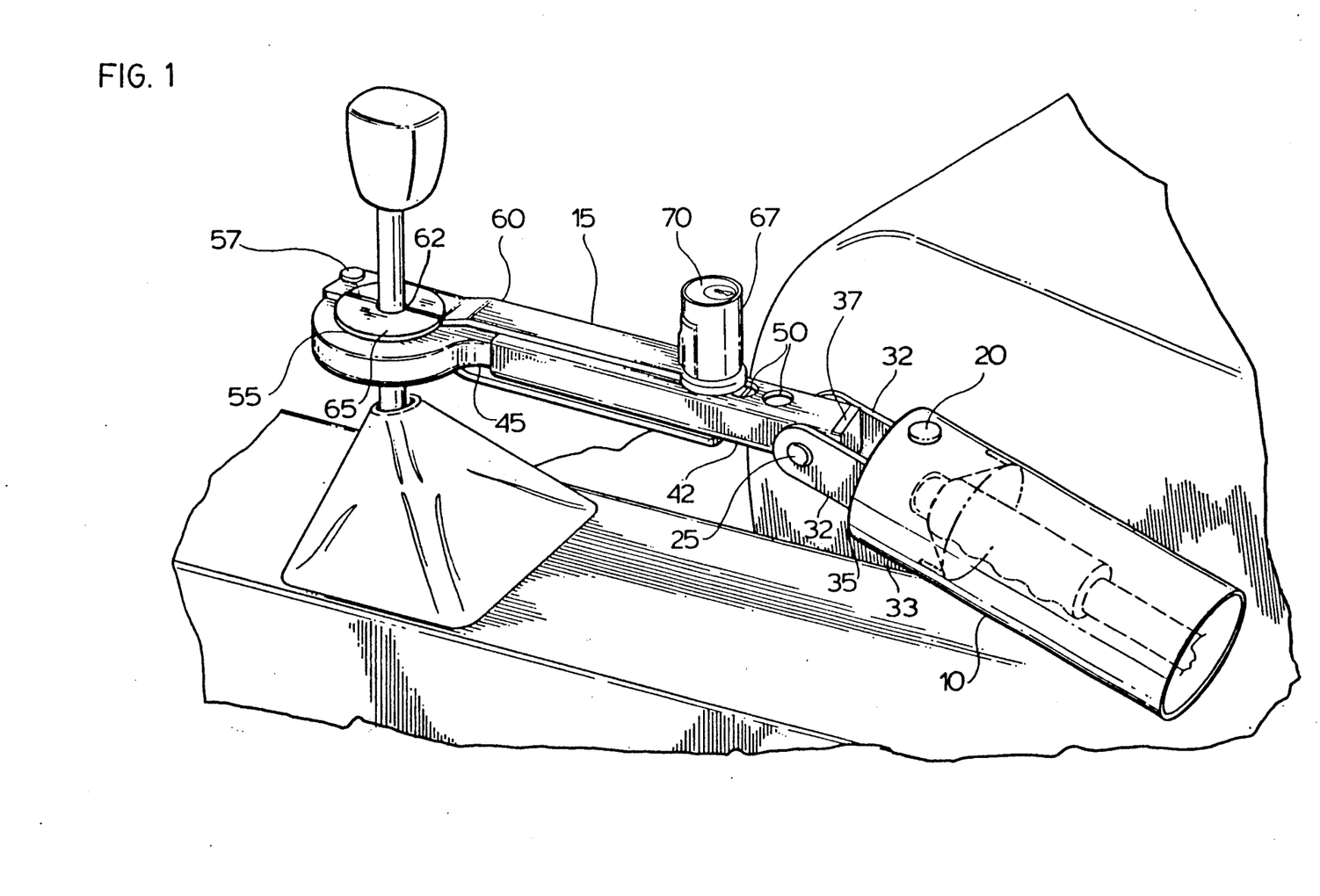
FIG. 1 is a perspective view illustrating a preferred practical embodiment of an anti-theft device of the invention when in use locking a vehicle gear lever to a hand brake.

As illustrated in FIG. 1, an anti-theft device comprises the first limb (10) which, as shown, is a hollow cylinder, and the second limb (15) which is comprised of three parts (42), (45) and (60), the first two of which are longitudinally extensible along their length and which slide telescopically, the second (45) within the first (42). These two limbs are pivotally connected by pivot pins (20) and (25).

Figures 6, 7, 8, 9:
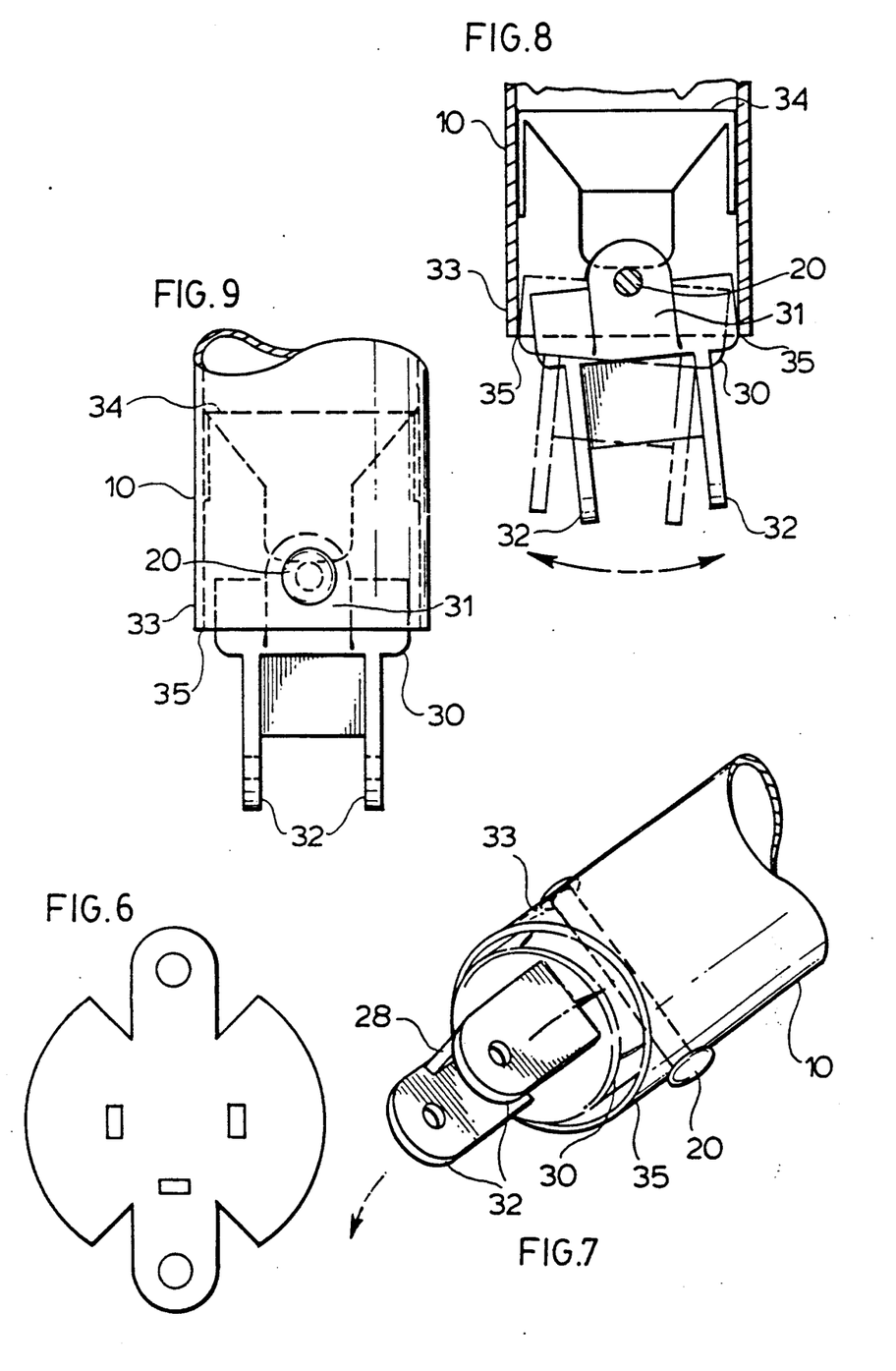
FIG. 6 is a plan view of the metal blank prior to forming, which is used to stamp out the joint section.
FIG. 7 is a perspective view of the metal blank once formed showing the joint section.
FIG. 8 is a view partially in cross section of the joint section showing the movement of the joint in a second plane.
FIG. 9 is a perspective view of the joint section.
Figure 6A:
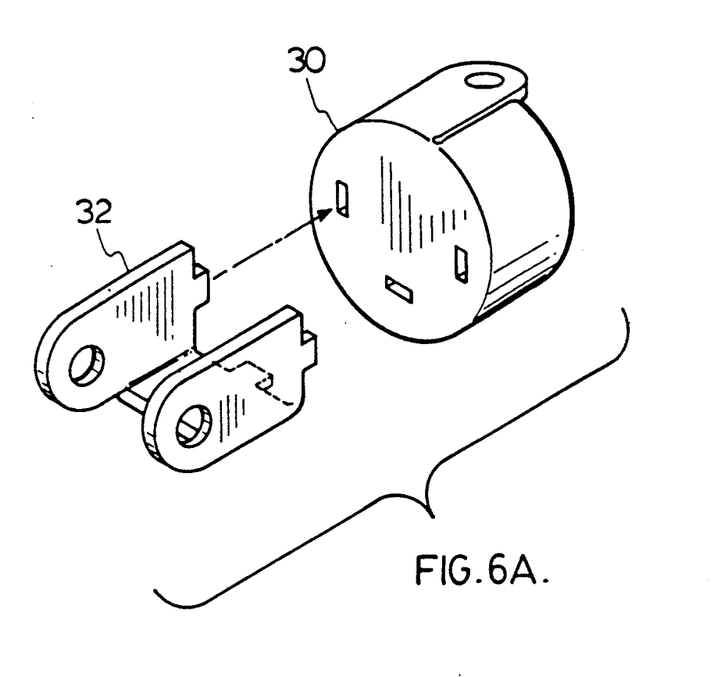
FIG. 6A is an exploded perspective view of the rounded disk and arms sitting in the end of the hollow cylinder.

A rounded disc (30), as best seen in FIG. 8, sits in the end (33) of the hollow cylinder (10) and has two pairs of diametrically spaced arms (31) and (32). One pair of arms (32) extend outwards from the cylinder (10) parallel to its axis. The other pair of arms (31) project from the disc (30) at a 90° rotation from the arms (32) and extend inwards and sit inside the hollow cylinder (10), also parallel to its axis.

Pivot pin (20) as seen in FIG. 8, is inserted diametrically through one end (33) of the cylinder (10) and through the inwardly extending arms (31). The disc (30) fits into cylinder (10) sufficiently loosely to allow it to pivot on pivot pin (20) so that arms (32) are swingable through a plane at an angle to the axis of the cylinder (10). This angle is only limited by the jamming of the disc (30) against the circular end edge (35) of the cylinder (10).

The end (37) as seen in FIG. 1, of the first part (42) of the second limb (15) is located between the two outwardly extending arms (32). Pivot pin (25) is inserted through these arms (32) and through the end (37) of the second limb (15). The second limb (15) can then pivot on pivot pin (25) in a second plane at an angle which is substantially at right angles to the first plane. This angle is limited by a stop mechanism (28), shown in FIG. 2 which is in the form of a cross bar which extends between the two outwardly extending arms (32).

Figure 3:
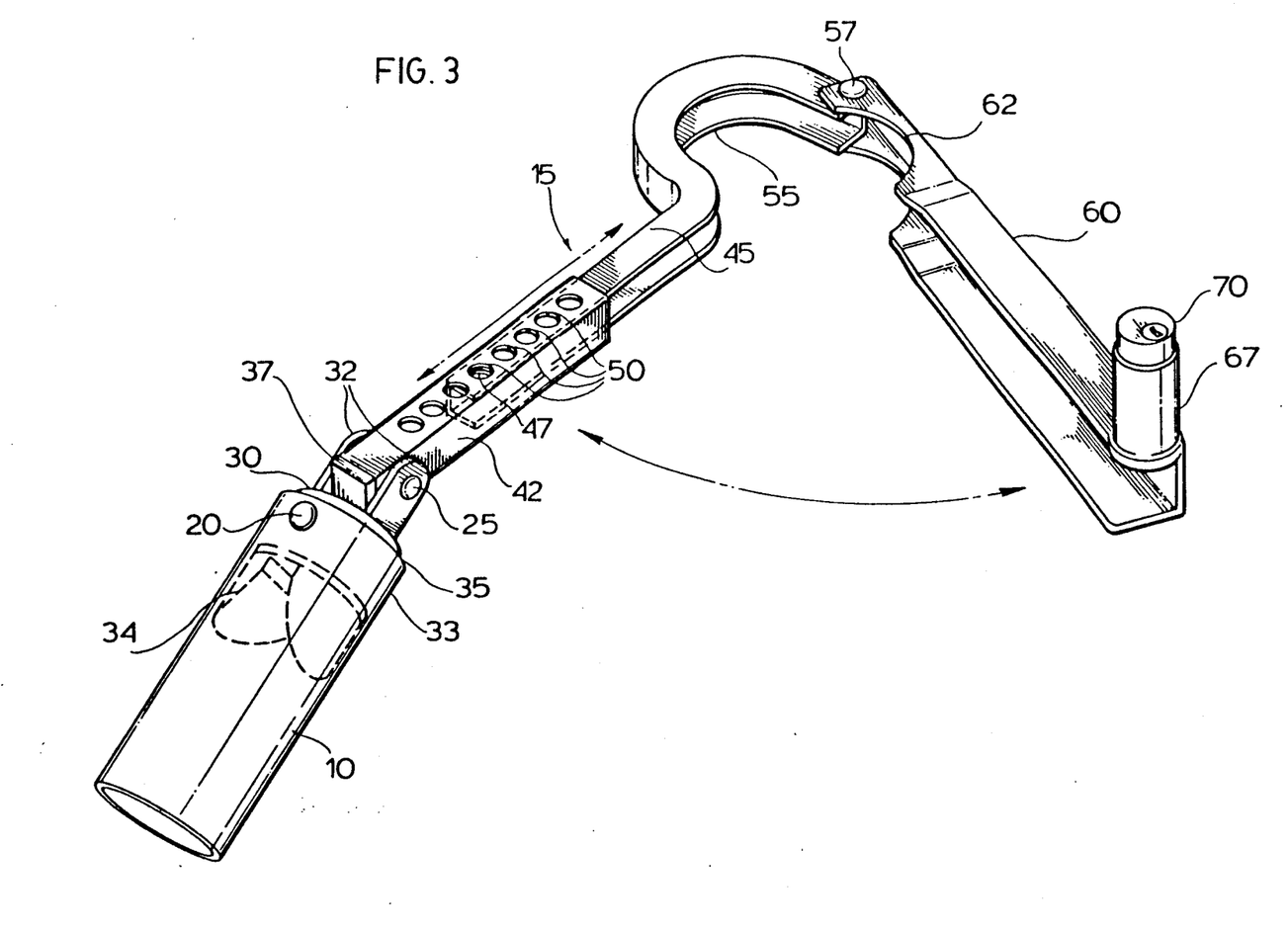
FIG. 3 is a perspective view from the top showing the anti-theft device in the open position.
Figure 4A:
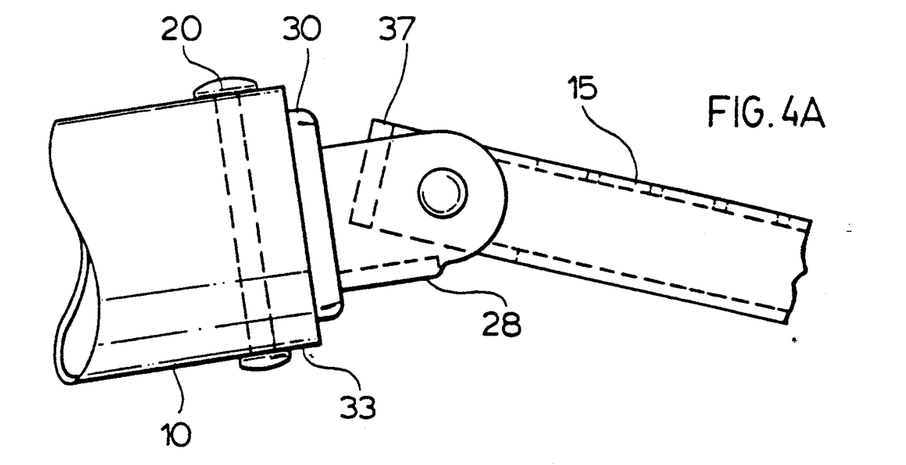
FIG. 4A is a fragmentary plan view of the joint which connects one limb to another.
Figure 4B:
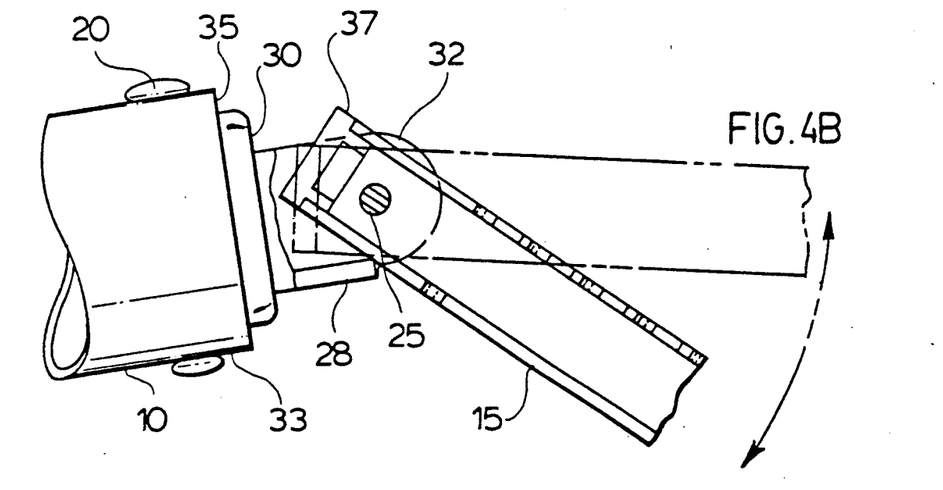
FIG. 4B is a fragmentary plan view of the joint which connects one limb to another and which shows a first plane of movement.

The cylinder (10) may be closed by a rubber insert (34) shown in FIG. 3, in skeleton which lies approximately 1¼ inches from the end (33) of the cylinder (10). When the rubber insert (34) is present it should be located in the cylinder (10) beneath the rounded disc (30), so that it abuts the head of the brake lever to limit movement of the hollow cylinder longitudinally and latitudinally, to prevent rattling of the brake lever.

Figure 2:
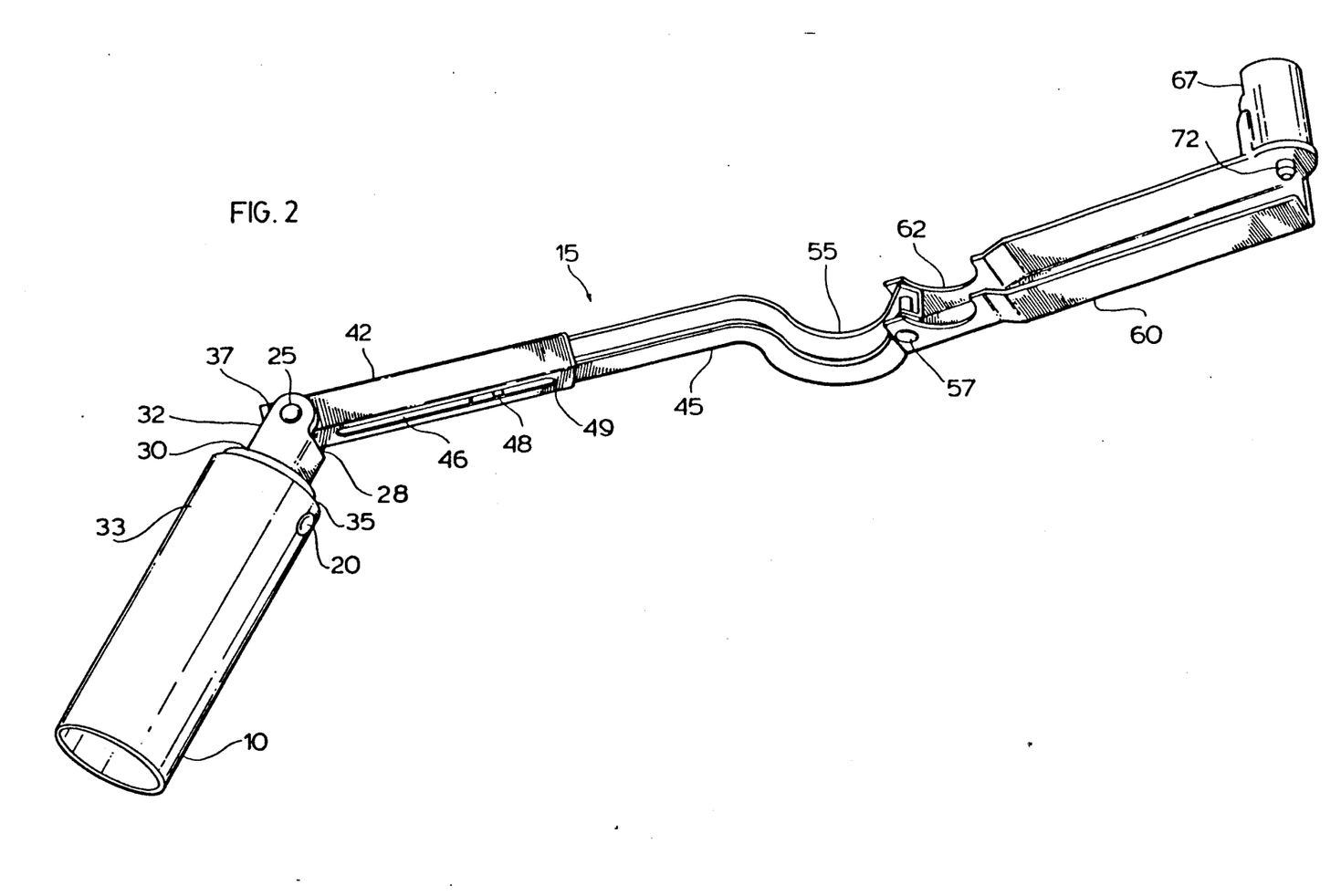
FIG. 2 is a perspective view from the bottom showing the anti-theft device in the open position.

The first part (42) as seen in FIG. 3 of the second limb is a hollow rectangular member closed in on all four sides and possibly at one end. It contains evenly spaced apertures along the top (50) and a punched out elongate oblong slot along the bottom (46), as shown in FIG. 2.

The second part (45) of the second limb (15) slides telescopically within the first part (42) and is provided with means to prevent withdrawal of the second limb from the first. The means to prevent withdrawal of the second part (45) from the first (42) may suitably be a screw (48) as shown in FIG. 2 which projects into the slot (46) of the first limb, and slides along the length of the slot and abuts against the end of the slot once full extension of the first and second limb is achieved. The screw (48) is located at the proximal end of the second part (45) of the second limb at the bottom. Situated directly above the screw (48) also located at the proximal end of the second part (45) of the second limb (15) at the top is a single aperture (47) which can be seen in FIG. 3.

The second part (45) of the second limb (15) may be of a hollow rectangular shape but, for convenience of manufacture, may alternatively be of U section rather than closed in on all four sides. While there isn't any reason it shouldn't be closed in on all four sides, it is easier to eliminate welding if only 3 sides are present. The distal end of the second part (45) is pivotally connected by a pivot pin (57) to the third part (60) of the second limb. The configuration may be an arcuate section (55) at the distal end of the second part (45) and a corresponding arcuate portion (62) on the third part (60). Suitably the arcuate portion (55) may be formed by a bend in the end of the second part (45) whereas the arcuate portion (62) is formed by a cutout. When the device is in the closed position as shown by FIG. 1 these two arcuate portions (55), (62) meet to form a bore (65) and enclose the gear lever. A resiliently deformable insert (not shown) can be fitted inside the bore (65) to closely surround and secure the gear shift lever.

This third part (60) of the second limb is also conveniently a U section, which third part can pivot on pivot pin (57) to fit around the first two parts (42) and (45) of the second limb (15) and to act as an outer jacket over the first (42) and second (45) parts as shown by FIG. 1.

Figure 5:
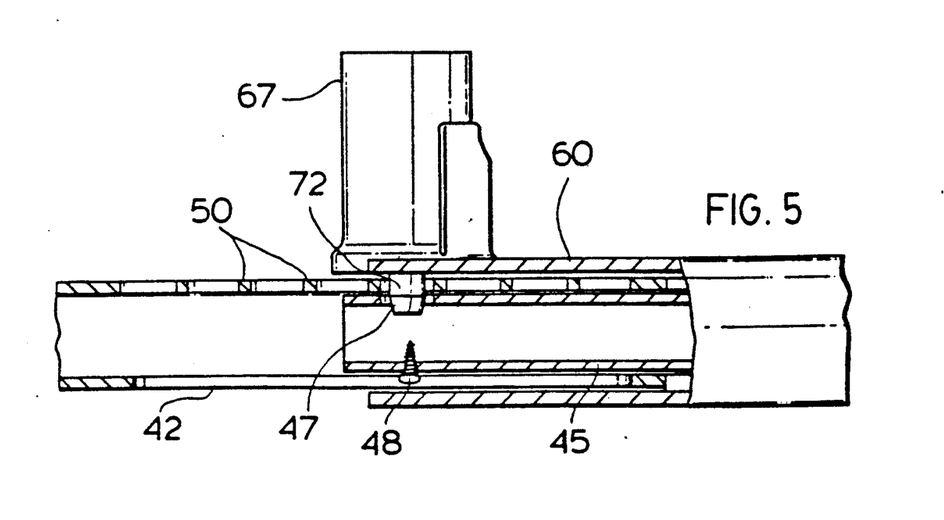
FIG. 5 is a fragmentary plan view of the locking element partially in cross section showing the three parts of the second limb.

The third part also contains a locking device (67) at its free end. This locking device (67) is actuated by manual pressure to the top of a depressible button (70) which projects upwards when it is not in the locked position as shown by FIG. 3. Once the button (70) which is connected to a retractable bolt (72) as shown by FIG. 5 is pushed down, it forces the bolt through any of the chosen apertures (50) evenly situated along the length of the first part (42) of the second arm (15). Through such action all three parts of the second limb are immobilized relative to each other. The locking mechanism (67) is not released without the use of an unlocking mechanism either through a key and latch or possibly a combination lock, however when this unlocking mechanism is activated a spring releases the bolt (72) which then dislodges from the apertures (50).

The whole device excepting the locking element (67) itself but including the cylinder in which the locking element is housed is composed of a sturdy material so as to resist easy harm or cutting. As well, the device is constructed so that all welding is eliminated, excepting welding in the region of the locking element.

I claim:

1. In an anti-theft device comprising first and second limbs, each securable to a control lever of a vehicle, a pivot link comprising a substantially circular disc which loosely fits within the first limb, from which disc projects a diametric pair of inwardly extending arms and a diametric pair of outwardly extending arms, and a pivot pin extends diametrically across the first limb through the inwardly extending arms to allow pivoting of the disc about the pin.

2. A device as claimed in claim 1 wherein one end of the second limb fits between said outwardly extending arms to pivot on a second pivot pin which pierces said outwardly extending arms.

3. The device as claimed in claim 1 wherein:
   the second limb comprises first, second and third nesting members;
   the first member is pivotally connected at one end to the first limb, and the first and second members are connected for relative telescopic movement;
   the second and third members define a shackle between them, at pivotally connected shackle ends thereof, whereby the second and third members are pivotable between an open position to release the second control lever and a closed position to shackle the second control lever; and
   locking means is provided to both lock the second and third members in the closed position and to lock the first and second members against telescopic movement.

4. An anti-theft device for securing two control levers of a vehicle, comprising:
   a first hollow limb having an open end adapted to locate therein a first control lever having a free end; and
   a second limb adapted to releaseably shackle a second control lever; and wherein:
   the first limb is pivotally connected to the second limb for pivotal movement of the second limb relative to the first limb in first and second pivot axes each orthogonal to a longitudinal axis of the first limb whereby the relative position of the first and second limbs are adjustable to locate therein and shackle respectively the first and second control levers; and
   a substantially circular disc loosely fits within the first limb, from which disc projects a diametric pair of inwardly extending arms and a diametric pair of outwardly extending arms, and a first pivot pin extends diametrically across the first hollow limb through the inwardly extending arms to allow pivoting of the disc about the pin.

5. An anti-theft device as claimed in claim 4 wherein:
the second limb comprises first, second and third nesting members;
the first member is pivotally connected at one end to the first limb and the first and second members are connected for relative telescopic movement;
the second and third members define a shackle between them, at pivotally connected shackle ends thereof, whereby the second and third members are pivotable between an open position to release the second control lever and a closed position to shackle the second control lever; and
locking means is provided to both lock the second and third members in the closed position and to lock the first and second members against telescopic movement.

6. A device as claimed in claim 5 wherein one end of the first member of the second limb fits between the outwardly extending arms to pivot on a second pivot pin which pierces the outwardly extending arms.

7. A device as claimed in claim 6 wherein a stop element in the form of a cross bar extends between the diametric pair of outwardly extending arms, which stop element limits the extent of pivoting of the first member of the second limb on the second pivot pin.

8. A device as claimed in claim 5 in which stop means are provided to prevent disengagement of the first and second members.

9. A device as claimed in claim 8 wherein the second member slides telescopically within the first member and the stop means comprise a projection on the second member to engage a longitudinal closed ended slot on the first member.

10. A device as claimed in claim 9 wherein one of the first and second members is provided with a row of apertures and the other of the first and second members is provided with a matching aperture, the members being slidable relative to each other to mate the matching aperture with one of the row of apertures and in which the locking means comprises a retractable bolt adapted to project into mated apertures to latch the first, second and third members in nested relationship.

11. A device as claimed in claim 10 including a lock for the retractable bolt.

12. A device as claimed in claim 10 in which the first member is of rectangular section and the second and third members are of rectangular U section, and in which one of a leg or web of the third member is, in the closed position, located with respect to the first and second member to overlay said projection.

13. A device as claimed in claim 12 in which the projection comprises a projecting portion of a screw in threaded engagement with the first member.

14. A device as claimed in claim 13 in which an annulus of resiliently deformable material may be fitted into the shackle when in the closed position.

15. An anti-theft device for securing two control levers of a vehicle, comprising:
a first hollow limb having an open end adapted to locate therein a first control lever having a free end;
a second limb adapted to releaseably shackle a second control lever; and wherein:
the first limb is pivotally connected to the second limb for pivotal movement of the second limb relative to the first limb in first and second pivot axes each orthogonal to a longitudinal axis of the first limb whereby the relative position of the first and second limbs are adjustable to locate therein and shackle respectively the first and second control levers;
the second limb comprises first, second and third nesting members;
the first member is pivotally connected at one end to the first limb and the first and second members are connected for relative telescopic movement;
the second and third members define a shackle between them, at pivotally connected shackle ends thereof, whereby the second and third members are pivotable between an open position to release the second control lever and a closed position to shackle the second control lever;
locking means is provided to both lock the second and the third members in the closed position and to lock the first and second members against telescopic movement;
the second member slides telescopically within the first member and stop means comprising a projection on the second member engaging a longitudinal closed ended slot on the first member is provided to prevent disengagement of the first and second members; and
the first member is of rectangular section and the second and third members are of rectangular U section, and in which one of a leg or web of the third member is, in the closed position, located with respect to the first and second member to overlay said projection.

16. The device as claimed in claim 15 in which the projection comprises a projecting portion of a screw in threaded engagement with the first member.

17. The device as claimed in claim 16 in which an annulus of resiliently deformable material may be fitted into the shackle when in the closed position.

18. An anti-theft device for securing two control levers of a vehicle, comprising:
a first hollow limb having an open end adapted to locate therein a first control lever having a free end;
a second limb adapted to releaseably shackle a second control lever; and wherein:
the first limb is pivotally connected to the second limb for pivotal movement of the second limb relative to the first limb in first and second pivot axes each orthogonal to a longitudinal axis of the first limb whereby the relative position of the first and second limbs are adjustable to locate therein and shackle respectively the first and second control levers;
the second limb comprises first, second and third nesting members;
the first member is pivotally connected at one end to the first limb and the first and second members are connected for relative telescopic movement;
the second and third members define a shackle between them, at pivotally connected shackle ends thereof, whereby the second and third members are pivotable between an open position to release the second control lever and a closed position to shackle the second control lever;

locking means is provided to both lock the second and third members in the closed position and to lock the first and second members against telescopic movement;

the second member slides telescopically within the first member and there is a stop means comprising a projection on the second member engaging a longitudinal closed ended slot on the first member; and the first member is of rectangular section and the second and third members are of rectangular U section, and in which one of a leg or web of the third member is, in the closed position, located with respect to the first and second member to overlay said projection.

19. The device as claimed in claim 18 wherein a substantially circular disc loosely fits within the first limb, from which disc projects a diametric pair of inwardly extending arms, and a diametric pair of outwardly extending arms, and a pivot pin extends diametrically across the first hollow limb through the inwardly extending arms to allow pivoting of the disc about the pin.

20. The device as claimed in claim 19 wherein one end of the first member of the second limb fits between the outwardly extending arms to pivot on a second pivot pin which pierces the outwardly extending arms.

* * * * *